United States Patent
Kim et al.

(10) Patent No.: US 10,785,643 B2
(45) Date of Patent: Sep. 22, 2020

(54) DEEP LEARNING NEURAL NETWORK BASED SECURITY SYSTEM AND CONTROL METHOD THEREFOR

(71) Applicant: LG ELECTRONICS INC., Seoul (KR)

(72) Inventors: Jooyoung Kim, Santa Clara, CA (US); Danish Thomas, Santa Clara, CA (US); Jungjoon Lee, Santa Clara, CA (US); Viswanath Ganapathy, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/344,347

(22) PCT Filed: Oct. 23, 2017

(86) PCT No.: PCT/KR2017/011729
§ 371 (c)(1),
(2) Date: Apr. 23, 2019

(87) PCT Pub. No.: WO2018/080124
PCT Pub. Date: May 3, 2018

(65) Prior Publication Data
US 2020/0053559 A1    Feb. 13, 2020

Related U.S. Application Data

(60) Provisional application No. 62/411,698, filed on Oct. 24, 2016.

(51) Int. Cl.
*H04W 4/38*        (2018.01)
*H04W 36/06*     (2009.01)
(Continued)

(52) U.S. Cl.
CPC .... *H04W 12/00503* (2019.01); *G06K 9/6267* (2013.01); *G06N 3/0454* (2013.01); *H04W 12/00508* (2019.01)

(58) Field of Classification Search
CPC ... H04W 72/085; H04W 36/06; H04W 88/04; H04W 4/38
(Continued)

(56) References Cited

U.S. PATENT DOCUMENTS 8,539,359 B2 *  9/2013  Rapaport .............. G06Q 10/10
                                                                 715/751
8,830,863 B2 *  9/2014  Novak .................. H04W 36/06
                                                                 370/252
(Continued)

FOREIGN PATENT DOCUMENTS

WO        2015138740        9/2015

OTHER PUBLICATIONS

PCT International Application No. PCT/KR2017/011729, Written Opinion of the International Searching Authority dated Feb. 14, 2018, 25 pages.
(Continued)

*Primary Examiner* — William D Cumming
(74) *Attorney, Agent, or Firm* — Lee, Hong, Degerman, Kang & Waimey

(57) ABSTRACT

The present invention relates to a deep learning neural network based security system and a control method therefor and, more particularly, to a deep learning neural network based security system comprising: at least one WiFi node; and a deep learning module for detecting an object from a WiFi signal received from the WiFi node, wherein the deep learning module identifies information on the object when the object is detected.

18 Claims, 5 Drawing Sheets

(51) Int. Cl.
*H04W 12/00* (2009.01)
*G06K 9/62* (2006.01)
*G06N 3/04* (2006.01)

(58) Field of Classification Search
USPC .................. 455/11.1; 370/329, 252, 241
See application file for complete search history.

(56) References Cited

U.S. PATENT DOCUMENTS

| | | | | |
|---|---|---|---|---|
| 8,976,677 | B2* | 3/2015 | Novak | H04W 88/04 |
| | | | | 370/241 |
| 9,088,995 | B2* | 7/2015 | Novak | H04W 72/085 |
| 9,282,588 | B2* | 3/2016 | Novak | H04W 36/06 |
| 9,904,849 | B2* | 2/2018 | Estrada | G06N 3/04 |
| 10,019,654 | B1* | 7/2018 | Pisoni | G06K 9/3241 |
| 10,210,432 | B2* | 2/2019 | Pisoni | G06K 9/6267 |
| 10,235,994 | B2* | 3/2019 | Huang | G10L 15/02 |
| 10,372,985 | B2* | 8/2019 | Estrada | G06K 9/4642 |
| 10,436,615 | B2* | 10/2019 | Agarwal | H04W 4/38 |
| 2010/0205541 | A1* | 8/2010 | Rapaport | G06Q 10/10 |
| | | | | 715/753 |
| 2010/0312825 | A1* | 12/2010 | Camp | G06Q 50/26 |
| | | | | 709/203 |
| 2011/0182469 | A1 | 7/2011 | Ji et al. | |
| 2013/0003591 | A1* | 1/2013 | Novak | H04W 88/04 |
| | | | | 370/252 |
| 2013/0005240 | A1* | 1/2013 | Novak | H04B 7/26 |
| | | | | 455/11.1 |
| 2013/0064197 | A1* | 3/2013 | Novak | H04W 72/085 |
| | | | | 370/329 |
| 2015/0327328 | A1* | 11/2015 | Novak | H04W 36/06 |
| | | | | 455/11.1 |
| 2017/0256254 | A1* | 9/2017 | Huang | G10L 15/02 |
| 2017/0364733 | A1* | 12/2017 | Estrada | G06K 9/6262 |
| 2018/0189544 | A1* | 7/2018 | Estrada | G06K 9/6262 |
| 2018/0306609 | A1* | 10/2018 | Agarwal | H04L 67/12 |
| 2018/0307912 | A1* | 10/2018 | Selinger | G06K 9/78 |
| 2019/0005358 | A1* | 1/2019 | Pisoni | G06K 9/6256 |
| 2020/0053559 | A1* | 2/2020 | Kim | G06N 3/0454 |

OTHER PUBLICATIONS

Qian, K et al., "PADS: Passive detection of moving targets with dynamic speed using PHY layer information", 2014 20th IEEE International Conference on Parallel and Distributed Systems (ICPADS), Dec. 2014, 10 pages.

Wang, X. et al., "DeepFi: Deep Learning for Indoor Fingerprinting Using Channel State Information", 2015 IEEE Wireless Communications and Networking Conference (WCNC), Track 3: Mobile and Wireless Networks, pp. 1666-1671, Mar. 2015, 8 pages.

Kim, Y. et al., "Human Detection and Activity Classification Based on Micro-Doppler Signatures Using Deep Convolutional Neural Networks", IEEE Geoscience and Remote Sensing Letters, vol. 13, No. 1, pp. 8-12, Jan. 2016, 7 pages.

Wu, C. et al., "Non-Invasive Detection of Moving and Stationary Human With WiFi", IEEE Journal on Selected Areas in Communications, vol. 33, No. 11, pp. 2329-2342, Nov. 2015, 16 pages.

European Patent Office Application Serial No. 17865642.7, Search Report dated May 29, 2020, 9 pages.

Aminanto, M. et al., "Detecting Impersonation Attack in WiFi Networks Using Deep Learning Approach," International Conference on Financial Cryptography and Data Security, Aug. 2016, XP047407927, 12 pages.

* cited by examiner

DEEP LEARNING NEURAL NETWORK BASED SECURITY SYSTEM AND CONTROL METHOD THEREFOR

CROSS-REFERENCE TO RELATED APPLICATIONS

This application is the National Stage filing under 35 U.S.C. 371 of International Application No. PCT/KR2017/011729, filed on Oct. 23, 2017, which claims the benefit of U.S. Provisional Application No. 62/411,698, filed on Oct. 24, 2016, the contents of which are all hereby incorporated by reference herein in their entirety.

TECHNICAL FIELD

The present invention relates to a device-free passive RF based security safety system in an indoor/vehicular environment based on a deep learning neural network and control method thereof, and more particularly, to a security system of detecting and identifying an object using deep learning neural networks and control method thereof.

BACKGROUND ART

Various schemes of deep learning are being developed as one field of mechanical learning of teaching a computer human way of thinking A deep learning scheme is to enable a computer to learn prescribed data in a manner of representing the prescribed data in a computer-understandable form. Recently, there are many ongoing studies on better representation schemes and models for how to learn them. As a result of such studies, various deep learning schemes such as deep learning neural networks, convolutional neural networks and deep belief neural networks are applied to fields of computer vision, voice recognition, natural language processing, audio/signal processing and the like and show cutting edge results.

DISCLOSURE OF THE INVENTION

Technical Task

One technical task of the present invention is to solve various problems that can be caused in reality in addition to the aforementioned background art. Particularly, the technical task of the present invention is to provide a deep learning neural network based security system of detecting and identifying an object through a WiFi signal received from a WiFi node and control method thereof.

Technical Solutions

In one technical aspect of the present invention, provided herein is a deep learning neural network based security system, including at least one WiFi node and a deep learning module detecting an object from a WiFi signal received from the WiFi node, wherein if the object is detected, the deep learning module identifies information of the object.

According to one aspect of the present invention, the information of the object may include at least one of location and direction of the object, activity of the object, a type (human/pet) of the object, a number of the object and a posture of the object.

According to one aspect of the present invention, the deep learning neural network based security system may further include a gateway, wherein if the WiFi node is located in an indoor environment, the deep learning module receives a packet of the WiFi node from the gateway.

According to one aspect of the present invention, the deep learning module may use at least one of a deep learning neural network, a convolutional neural network, a deep discriminant network, and an auto encoder.

According to one aspect of the present invention, the deep learning neural network may detect data from the WiFi signal by real time.

According to one aspect of the present invention, the convolutional neural network may detect presence of the object from the WiFi signal.

According to one aspect of the present invention, the deep discriminant network may detect a location of the object from the WiFi signal.

According to one aspect of the present invention, the auto encoder may detect and classify activity of the object from the WiFi signal.

According to one aspect of the present invention, the deep learning module may collect Channel State Information (CSI) and Received Signal Strength Indicator (RSSI) data from the WiFi node and pre-process the collected CSI and RSSI data.

According to one aspect of the present invention, using pre-processing of the CSI and RSSI data, the deep learning module may filter the CSI data, remove outlier, and eliminate an error due to a phase of a signal generated by a frequency offset.

According to one aspect of the present invention, after pre-processing of the CSI and RSSI data, the deep learning module may generate Short-Time Fourier Transform (STFT) and Continuous Wavelet Transform (CWT) of the CSI data.

According to one aspect of the present invention, after pre-processing of the CSI and RSSI data, the deep learning module may classify a network with reference to presence of the object, presence of a type of the object, and the number of the object.

According to one aspect of the present invention, the deep learning module may detect whether the object is present in a preset area.

According to one aspect of the present invention, the deep learning module may identify whether the object is a person or a pet according to a type of the object. If the object is the person, the deep learning module may determine whether the person is a known person or a stranger and also determine an age of the person.

According to one aspect of the present invention, the deep learning module may detect the number of the object present in the preset area.

In another technical aspect of the present invention, provided herein is a method of controlling a deep learning neural network based security system, the method including detecting an object from a WiFi signal received from at least one WiFi node and if the object is detected, identifying information of the object.

Advantageous Effects

Effects of a system and control method thereof according to the present invention are described as follows.

According to at least one of embodiments of the present invention, a system detects and identifies a presence of a person, thereby automating smart products.

According to at least one of embodiments of the present invention, a system detects a location of a person, thereby securing the person's safety and security in an indoor environment.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
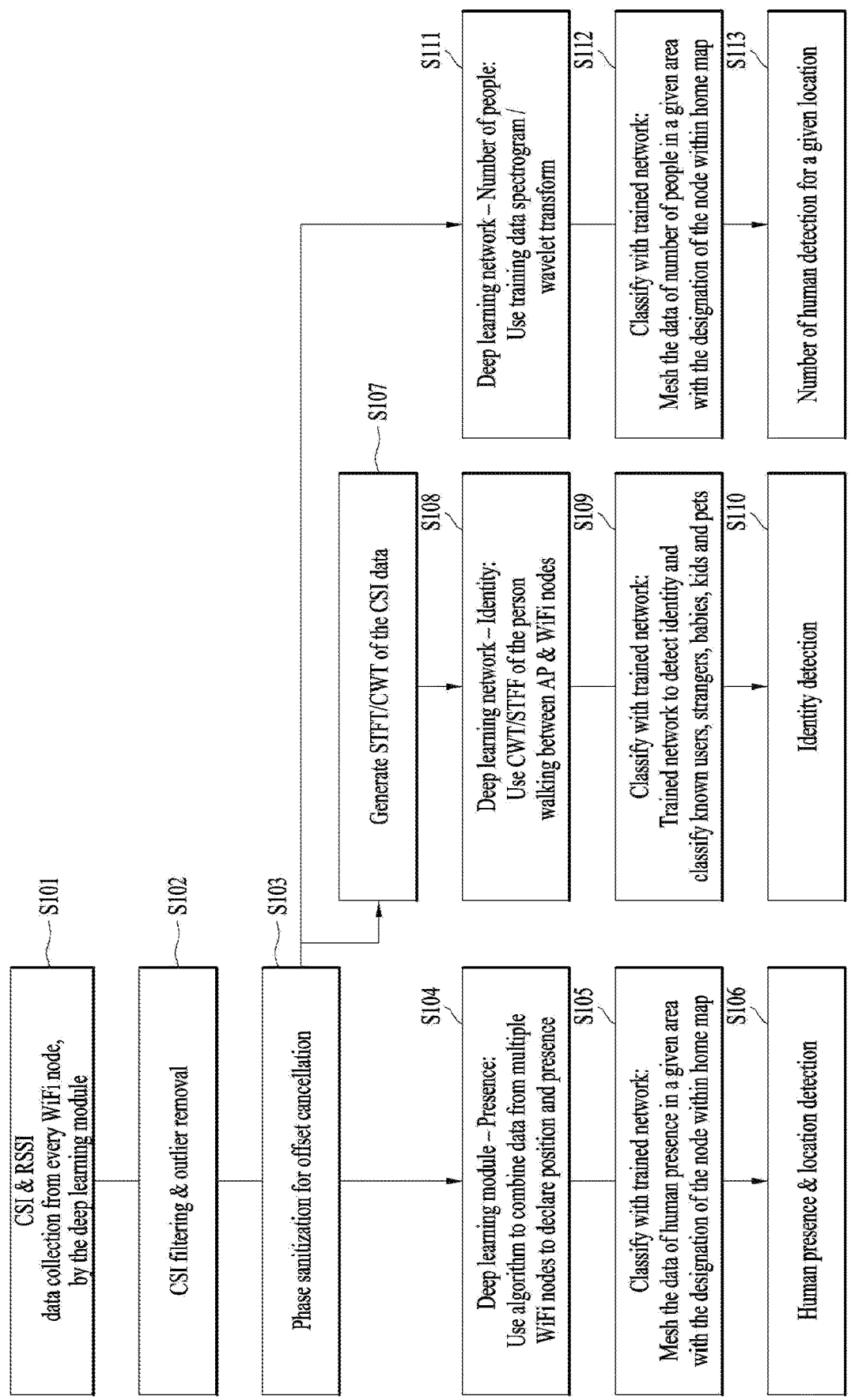
FIG. 1 is a diagram to describe steps of a deep learning neural network based security system according to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An Artificial Intelligence (AI) module plays a role in processing informations based on an AI technology and may include one or more modules of performing at least one of information learning, information reasoning, information perception, and natural language processing.

Using an AI module machine learning technology, it is able to perform at least one of learning, reasoning and processing on massive information (e.g., big data) such as information stored in a system, ambient environment information, information stored in an external storage place capable of communication, and the like.

A machine learning technology is the technology of collecting & learning large-scale informations on the basis of at least one algorithm and determining & predicting information based on the learned information. Learning of information is an operation of quantifying relationship between information and information by obtaining features, rules, determination references and the like of informations and predicting new data using a quantified pattern.

The algorithm used by such a machine learning technology may include an algorithm based on statistics and may include, for example, one of a decision tree using a tree structure as a prediction model, a neural network emulating neural network structures and functions of organism, a genetic programming based on evolution algorithm of organism, a clustering of distributing an observed example into a subset called a cluster, a Monte Carlo method of calculating a function value through randomly extracted random numbers, etc.

As a field of a machine learning technology, a deep learning technology is the technology of performing at least one of learning, determining and processing on informations using an artificial neural network algorithm. An artificial neural network may have a structure of connecting layers to each other and transferring data between the layers. Such a deep learning technology can learn a massive amount of information through an artificial neural network using a Graphic Processing Unit (GPU) optimized for a parallel operation.

Meanwhile, in order to collect a massive amount of informations to apply an AI module machine learning technology, it is able to collect (e.g., sense, monitor, extract, detect, receive, etc.) signals, data, information and the like inputted/outputted to/from a WiFi node. Moreover, it is able to collect (e.g., sense, monitor, extract, detect, receive, etc.) data, information and the like stored in an external storage place (e.g., cloud server) connected through AI module communication. Particularly, collection of information may be understood as a terminology including an operation of sensing information through a sensor, extracting information stored in a memory, or receiving informations from an external storage place through communication.

Such an AI module can collect a massive amount of informations on a background by real time and save information (e.g., knowledge graph, command policy, personalized database, conversation engine, etc.), which is processed into an appropriate form by learning the collected informations, to a memory.

Meanwhile, once a specific operation is executed, an AI module can analyze history information indicating execution of the specific operation through a machine learning technology and perform an update on the existing learned information based on such analysis information. Therefore, the AI module can improve accuracy of information prediction.

A deep learning module corresponding to a subordinate concept to the above-described AI module shall be described as follows.

Discussed in the following are a deep learning based security and safety system of deploying a WiFi network to detect, locate, and identify a person in an indoor environment by passively monitoring WiFi/RF signals and processing the WiFi signal logs using deep learning neural networks and method of controlling the same.

Particularly, a method of identifying the activity of a person in an indoor environment using a Deep learning Neural Networks (DNN) shall be described.

A WiFi node according to one embodiment of the present invention includes an always-on WiFi or RF node and may employ commercial WiFi NIC and exchange a minimum number of packets with an Access Point (AP). WiFi signals from different WiFi NICs in a network can be processed using an embedded GPU platform on a gateway node. In the following description, the gateway node is assumed as co-located with the access point. And, this network can be expanded to commercial WiFi/RF devices for additional functionality and coverage, while maintaining the data transmission capability of the network.

According to one embodiment of the present invention, a WiFi network enables a device-free security and safety system in an indoor, outdoor or vehicular environment. This is described in detail as follows.

A deep learning neural network based security system according to one embodiment of the present invention may include a deep learning module and a WiFi node.

Here, the deep learning module may include a Deep learning Neural Network (DNN) architecture, a convolutional neural network, a deep discriminant network and an auto encoder. Here, the DNN architecture can detect data from WiFi signal logs by real time. The convolutional neural network can detect presence of an object from a received WiFi signal. The deep discriminant network can detect a location/position of an object. And, the auto encoder can detect and classify activity of an object.

WiFi nodes may employ commercial WiFi communication. According to one embodiment of the present invention, the WiFi node can maintain a minimum packet exchange with an access point. The WiFi node can change a WiFi or RF signal if an object (e.g., human) is detected.

The deep learning module can perform the following functions by processing a WiFi or RF signal changed from a WiFi node.

According to one embodiment of the present invention, a deep learning module may detect moving or static human presence in an indoor/outdoor environment or a vehicular environment. The deep learning module may identify a location of a person in an indoor vehicular environment. The deep learning module may distinguish whether a detected object is a person or a pet. The deep learning module may identify an individual from a known set of people in an indoor environment. In this case, the deep learning module may identify a number of people in an indoor/outdoor environment. And, the deep learning module may identify the activity/posture/orientation of an individual.

According to one embodiment of the present invention, the deep learning module may receive packets from the gateway to WiFi nodes in order to connect to an indoor WiFi node.

Namely, people detection and people's location and activity identification by the deep learning module enables multiple applications in indoor security as well safety products and services.

In this case, applications enabled by the DNN based security system (hereinafter, system) according to one embodiment of the present invention may include the following examples.

The security and safety functions in an indoor/vehicular environment providable by a system according to one embodiment of the present invention are described as follows.

The system according to one embodiment of the present invention may arm or disarm an automatic home alarm. The system may detect presence or non-presence of glass breaking for illegal intruder detection without additional sensors. The system may detect a trespasser and take a preemptive deterrence measure with automating with other security products as well as third party components. The system may configure a smart fire/gas alarm alert threshold based on the user presence, location and activities detected. If a user remains static for a long time, the system may automatically turn off lighting. In this case, the system may turn off the lighting based on the user presence detection, unlike the IR-based motion sensors. The system may alert the user if a device-free children or pet leaves a designated area. Likewise, the system may perform elder care and fall detection. The system may detect presence or non-presence of an infant cry. In particular, the system may detect presence of lip movement of the infant using WiFi nodes mounted in close proximity to an infant crib. Hence, the system may analyze the detected lip movements and compare them with known lips associated with the infant cry, thereby determining the presence of the infant cry. Moreover, as WiFi nodes are deployed near the infant crib, the system may reliably identify the presence of lip movement as well infant respiration. In a car environment instead of an indoor environment, the system may identify presence of an infant cry by detecting infant's lip movement and breathing rate through WiFi nodes near vehicle seats.

A system according to one embodiment of the present invention may automate smart appliances based on the detected proximity/identity of an individual.

A system according to one embodiment of the present invention may automate third party components as well.

A method of detecting a presence and location of a person, a method of identifying a type of a person, and a method of detecting the number of people are described in detail with reference to FIG. 1 as follows.

Particularly, a deep learning module included in a DNN based security system may control each of the following steps.

FIG. 1 is a diagram to describe steps of a deep learning neural network based security system according to one embodiment of the present invention.

In a step S101, a system can collect data from all WiFi nodes.

In a step S102, the system can perform filtering of CSI data and remove outlier.

In a step S103, the system can sanitize a phase for offset cancellation.

In a step S104, if checking presence of a network using a deep learning network, the system can declare a position and presence of the network by combining data from a multitude of WiFi nodes together using algorithm.

In a step S105, the system can classify the network trained in the step S104. In particular, the system can mesh data of presence of an object (e.g., a person) in a given area with designation of a node within an indoor environment map.

Namely, in a step S106, the system can detect the human presence and location through the step S104 and the strep S105. This shall be described in detail with reference to FIG. 3 later.

In a step S107, the system can generate Short-Time Fourier Transform/Continuous Wavelet Transform (STFT/CWT) of CSI data.

In a step S108, the system can use CWT/STFF of a person moving between an access point and a WiFi node if identifying the deep learning network.

In a step S109, the system can classify the network trained in the step S108. In particular, the system can identify a type of an object. Namely, the system can check an identity and then classify presence of known users, strangers, babies and pets.

Namely, in a step S110, the system can detect an identity through the steps S107 to S109. This shall be described in detail with reference to FIG. 4.

In a step S111, the system can detect the number of people through the deep learning network. In particular, the system can detect the number of people using a training data spectrogram and a wavelet transform.

In a step S112, the system can classify with the network trained in the step S111. In particular, the system can mesh the data of the number of objects (e.g., persons) in a given area with the designation of the node within the indoor environment.

In a step S113, the system can detect the number of people at a given location through the step S111 and the step S112. This shall be described in detail with reference to FIG. 5.

Therefore, the architecture of the multi-node RF/WiFi network of the present invention enables the security and safety in an indoor environment using commercial RF/WiFi signals (radios).

Particularly, the features of the present invention are described as follows.

A deep learning neural network according to one embodiment of the present invention may detect all the abovementioned features by real time. Here, the deep learning neural network may learn parameters that will be estimated if noise and other errors are present in a commercial RF/WiFi signal.

In particular, a phase error may be generated in a commercial WiFi signal and such an error may lower detection reliability. Yet, if the error is present, the deep learning neural network can learn a parameter that will be detected during a training. Hence, an engineer need not handcraft parameters that will be estimated by the deep learning neural network, and the supervised and unsupervised deep learning neural network may perform estimation in order to detect presence/absence, activity and location.

According to one embodiment of the present invention, the system may detect passive proximity, location and activity detected using a set of distributed WiFi/RF nodes, which offer immense potential to replace proximity sensors for several applications. Therefore, novel safety applications including home security and safety products, home automation products and smart home management services are available.

According to one embodiment of the present invention, the DNN based system may learn the changes in Channel State Information (CSI) and Received Signal Strength Indication (RSSI) data of human movement and differentiate it from movements of pets. Further, the DNN based system may detect movements of other obstacles in a home environment.

The presence detection using commodity WiFi/RF devices using first/second order statistics derived from CSI and RSSI logs may use the related art. Likewise, the passive indoor location using RF devices has been explored in literature, which employs linear discriminant analysis and probability models to arrive at training location estimates. And, second order statistics and hidden Markov models has been explored in literature as well.

Described in the following are an overall system architecture, a deep learning based embodiment for human detection, an embodiment of identifying an individual using a DNN, passive detection and classification of human activity, an embodiment of detecting a location of a person in an indoor environment using DNN, and applications in the area of safety and security.

Figure 2:
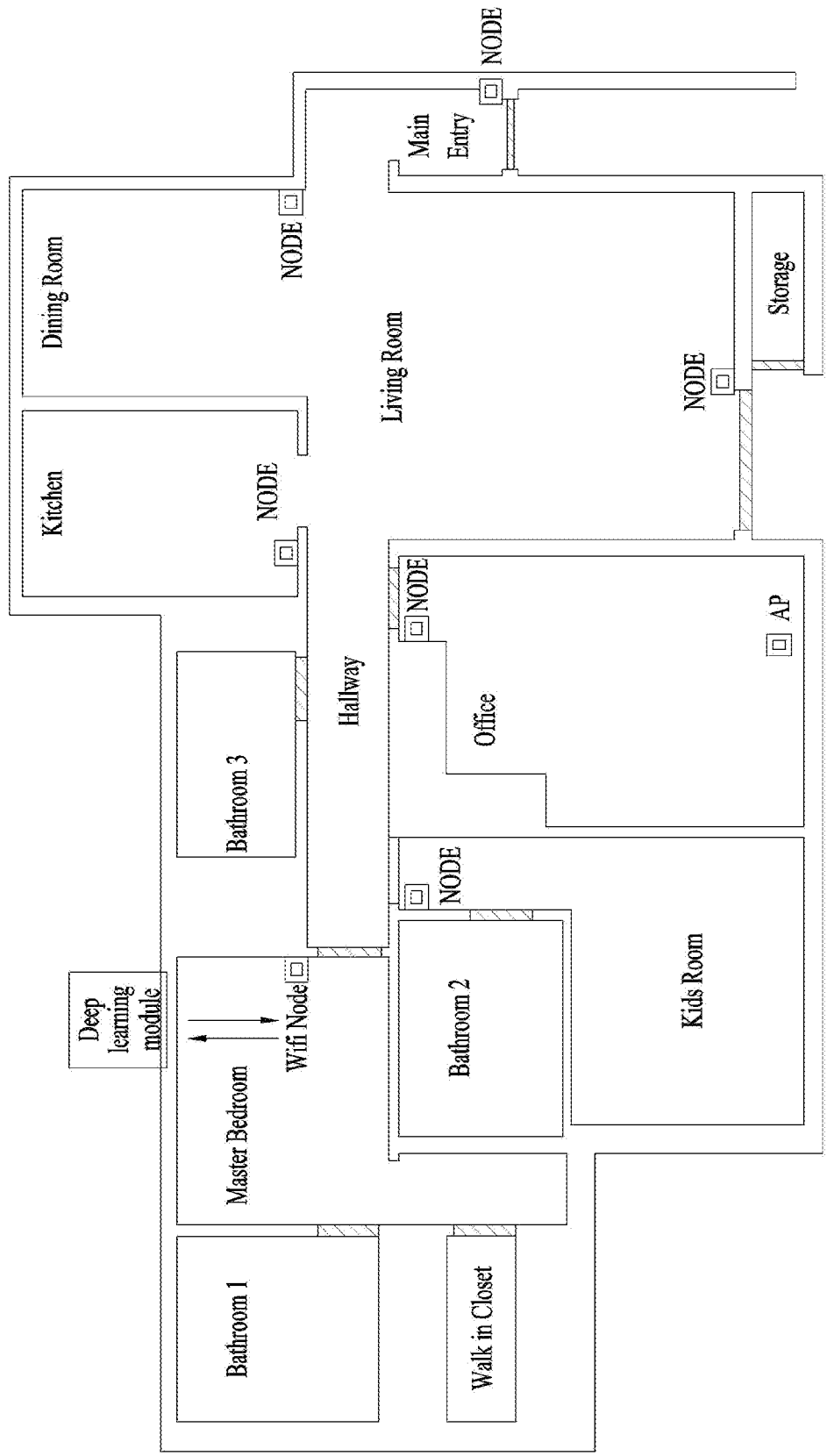
FIG. 2 is a diagram to describe deployment of RF/WiFi nodes and a gateway in a typical indoor environment according to one embodiment of the present invention.

FIG. 2 is a diagram to describe deployment of RF/WiFi nodes and a gateway in a typical indoor environment according to one embodiment of the present invention.

In FIG. 2, a typical home with a WiFi/RF node positioned in each room of size 30 to 40 square meters is taken as an example for description. Here, the RF node can communicate with other WiFi nodes or AP. A bandwidth of the RF node varies based on an application. Fine movement and activity detection may require an RF node with wider bandwidth. Larger rooms may have more WiFi nodes deployed.

Here, each WiFi Node is connected to the AP and may exchange at least 20 ping packets every second. A WiFi driver is enabled to log CSI data of each WiFi node. Particularly, a WiFi node with 80 MHz bandwidth enables finer detection and classification of activities.

Commercial On-The-shelf (COTs) WiFi nodes may be employed to perform the aforementioned functions. The COTs WiFi node can exchange at least 20 ping packets every second with the AP. The CSI and RSSI logs for each node may be pre-processed, whereby features can be extracted by a deep learning neural network.

A gateway node with an appropriate GPU can implement the deep learning neural network. Here, the gateway node is assumed as co-located with the AP.

Moreover, according to one embodiment of the present invention, the detected object, number of people, location of activity, nature of activity etc. can be uploaded to the Cloud for continuous remote monitoring.

Figure 3:
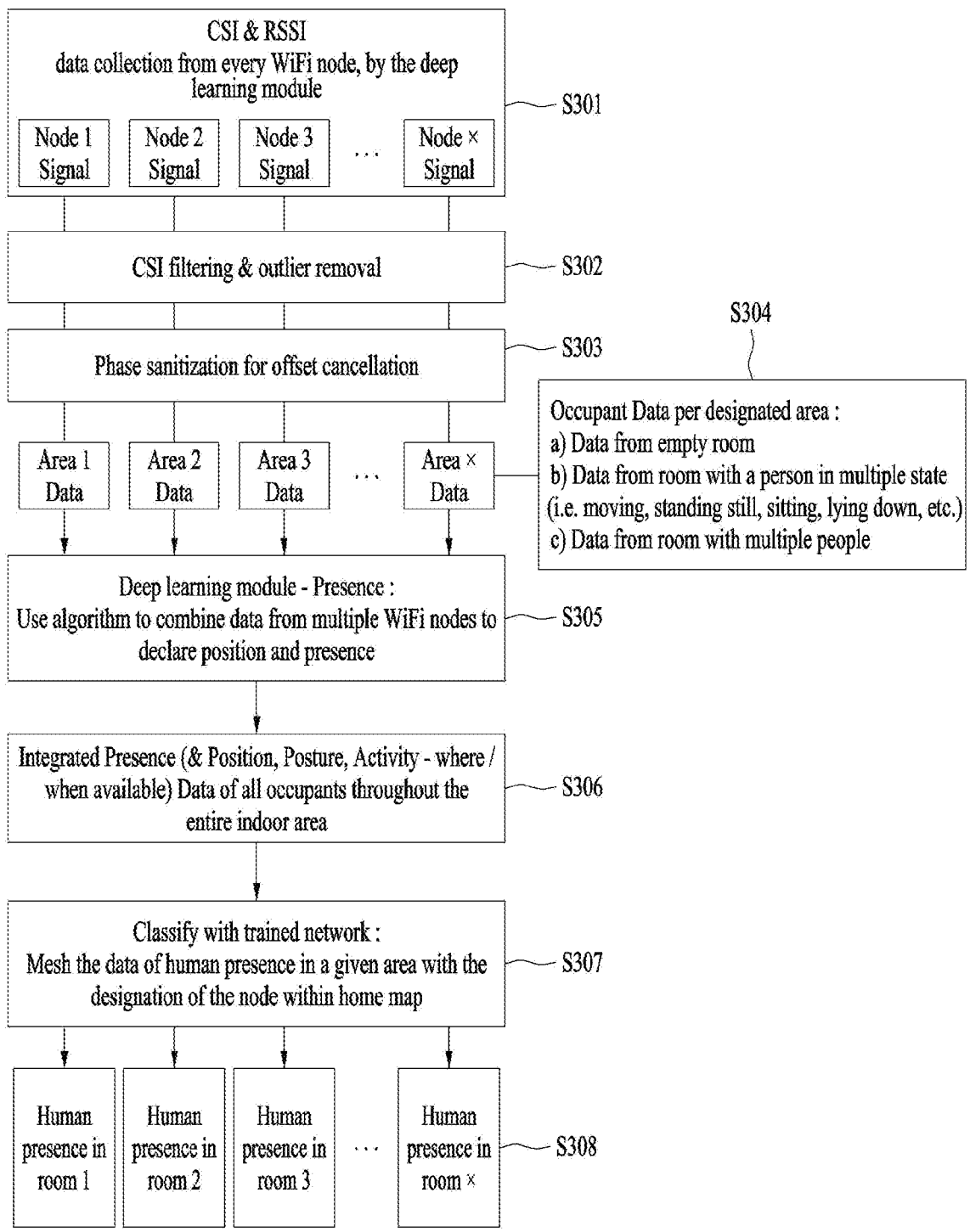
FIG. 3 is a diagram to describe an example of detecting a person using a deep learning neural network according to one embodiment of the present invention.

FIG. 3 is a diagram to describe an example of detecting a person using a deep learning neural network according to one embodiment of the present invention.

In particular, FIG. 3 shows a method of detecting a person moving near a WiFi node and checking an approximate location inside or outside a preset room.

In a step S301, a DNN based security system (hereinafter, system) may collect CSI and RSSI data from all WiFi/RF nodes. Thereafter, the collected CSI and RSSI data may be processed. For details, steps S302 and S303 are described as follows.

In the step S302, the system can perform filtering of the CSI data and eliminate outliers of the CSI data in a CSI and RSSI data pre-processing step.

In the step S303, in the CSI and RSSI data processing step, the system may eliminate errors introduced in the phase of the signal due to frequency offsets etc.

In the step S304, the system may collect occupant data per designated area. For example, the system can collect data from an empty room, data from a room with a person in multiple states (e.g., moving, standing still, sitting, lying down, etc.), or data from a room with multiple people.

In a step S305, the system may declare presence of a deep learning network. In particular, the system may declare a location and presence of the deep learning network by combining data from a multitude of WiFi nodes together using algorithm.

In a step S306, the system can integrate presence of data (e.g., presence, position, posture, activity, where, when available, etc.) of all occupants in the whole indoor area.

In a step S307, the system can classify with a trained work through the steps S301 to S306.

In a step S308, the system may check human presence in a designated area.

The present invention is described in detail as follows.

According to one embodiment of the present invention, a system can generate a time-frequency representation or a time-scale representation of a filtered signal The system can generate a trained data, and the time-frequency or time-scale representation of the data may be generated in an indoor environment. Here, a CSI log with no human presence, a CSI log with a moving person and a CSI log with static person serves are used to generate the time-frequency representation to train a deep learning network. Here, the CSI logs may be generated to cover a basic set of an individual scenario detected reliably.

According to one embodiment of the present invention, a method of generating efficient training data and updating the training data is described as follows. Particularly, a system needs to reliably check a location of a boundary of a room. In doing so, if there is a person moving on a boundary of a room, as CSI and RSSI data logs are generated to identify the room boundary. And, the CSI logs may be updated in a manner of being regularly incremented.

The architectures of the deep learning network and the DNN training are described as follows.

According to one embodiment of the present invention, a convolutional neural network or deep learning discriminant analysis may be employed. The time-frequency or time-scale data may be used to train the neural networks. Batches of data are employed to train the network using stochastic gradient descent.

It is able to use an unsupervised deep learning neural network using an auto encoder. Particularly, a filtered signal from RSSI/CSI logs is processed and time-frequency representation may be computed. An unsupervised DNN architecture learns the features and classifies the features using a classifier. Here, a rectified softmax classifier may be employed.

Particularly, the features of the present invention are described as follows.

If first and second statistics of the CSI/RSSI are employed to detect presence of people inside a room in a related art, a deep learning network is employed to reliably detect presence of people in an indoor or outdoor environment in the present invention. Particularly, a deep learning neural network can detect presence reliably in the presence of noise. In doing so, the noise may be introduced by COTS WiFi radios or movements of objects in a home environment due to wind etc. Namely, the DNN scheme may detect presence with minimal false positives.

Figure 4:
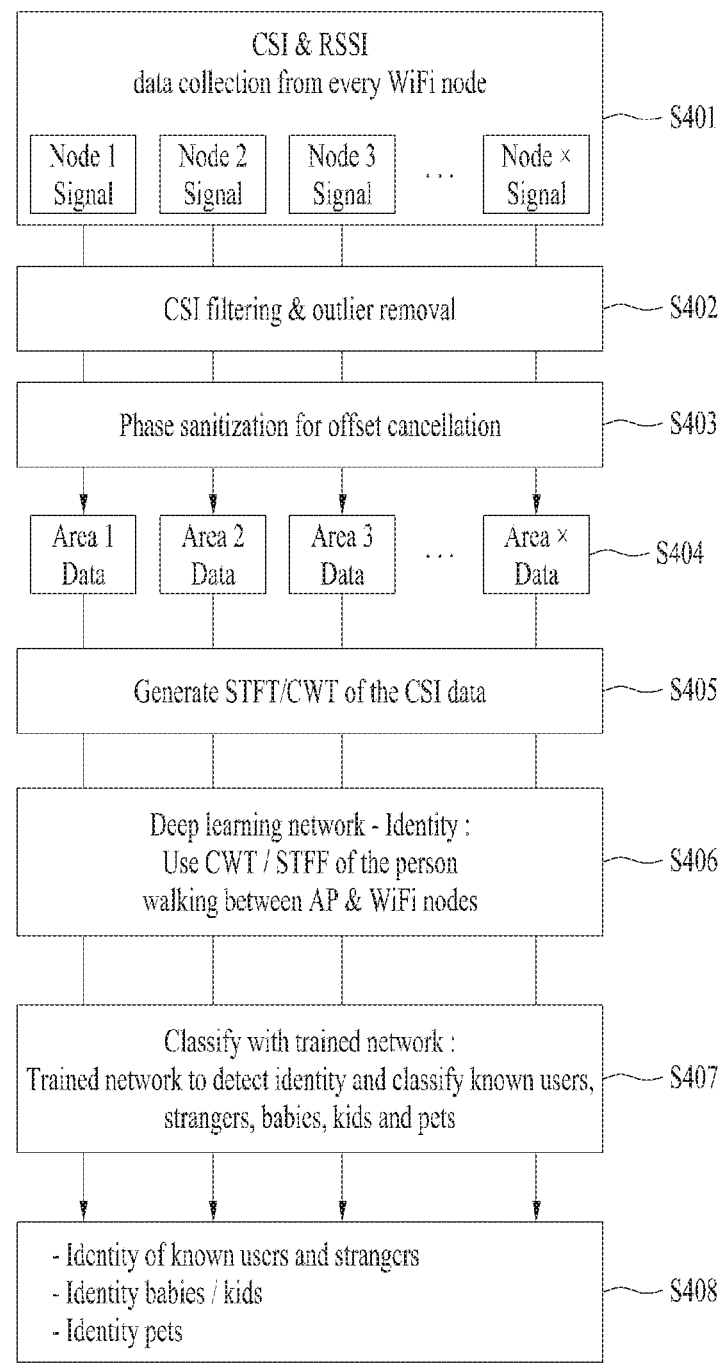
FIG. 4 is a diagram to describe an example of identifying a person using a deep learning neural network according to one embodiment of the present invention.

FIG. 4 is a diagram to describe an example of identifying a person using a deep learning neural network according to one embodiment of the present invention.

Steps S401 to S404 are identical to the former steps S301 to S304 shown in FIG. 3.

Namely, in the step S401, a DNN based security system (hereinafter, system) may collect CSI and RSSI data from all WiFi/RF nodes. Thereafter, the collected CSI and RSSI data may be processed. For details, steps S402 and S403 are described as follows.

In the step S402, the system can perform filtering of the CSI data and eliminate outliers of the CSI data in a CSI and RSSI data pre-processing step.

In the step S403, in the CSI and RSSI data processing step, the system can eliminate errors caused by a phase of a signal generated due to frequency offsets etc.

In the step S404, the system can collect occupant data per designated area. For example, the system can collect data from an empty room, data from a room with a person in multiple states (e.g., moving, standing still, sitting, lying down, etc.), or data from a room with multiple people.

In a step S405, the system can generate STFT/CWT.

In a step S406, the system can identify a deep learning network. Particularly, the system can identify a network using CWT/STFT of a person walking between an access point and a WiFi node.

In a step S407, the system can classify the network trained through the steps S401 to S406. Particularly, the system checks an identity and can classify a known user, a stranger, a baby, a kid, and a pet.

Namely, in a step S408, the system can identify a known user, a stranger, a baby/kid, or a pet.

The present invention is described in detail as follows.

Each person can be characterized by length of limbs, the variations in limb movement, stride length, movement of limbs while walking etc. Particularly, the swaying limbs while walking introduces changes in CSI data of a WiFi signal. Here, the time-frequency or time-scale representation of a CSI log file succinctly captures all these characteristics associated with each individual.

A system according to one embodiment of the present invention can gather CSI logs for each individual identified uniquely. Hence, the CSI logs can be generated for each individual when walking, running or standing. Likewise, to differentiate between a pet and human, similar CSI log files can be generated for pets as well.

For this, typical processing steps are described as follows.

According to one embodiment of the present invention, a system can gather CSI and RSSI data. In this case, the system can remove phased errors generated due to inadequate phase compensation for COTs WiFi devices.

The system can compute time-frequency or time-scale representation. Particularly, a low frequency region in the time-frequency representation (typically less than 100 Hz) characterized by limb movements can be associated with an individual by the system.

And, the system can train the deep learning neural network for the data from an individual as well a pet. The deep learning convolutional network can be trained on a GPU. Here, the network can be deployed on an NVIDIA embedded platform.

Further, the deep neural network can be trained with CSI logs associated with distinct movements, i.e., walking, running, sitting, falling, bending, etc. to identify movements as well.

Particularly, the features of the present invention are described as follows.

A deep learning neural network according to one embodiment of the present invention can identify an individual and differentiate a moving pet from a human.

A deep learning neural network can learn several features from training data. Conventional hand-crafted machine learning systems rely first, second and other higher order statistics extracted from the time series data. On the contrary, from a carefully crafted training data, a DNN can learn several parameters and differentiate several seemingly close data.

And, a conventional weighted classifier is prone to false positives. Namely, conventional parameters such as mean, variance, median, maximum value, minimum value, frequency characteristics, rate of change of frequency etc. can be extracted from time series data. Since the weighted classifier is designed from the information, it is prone to false positives. On the contrary, since a DNN based classifier learns from training data, it can reduce false positives.

Figure 5:
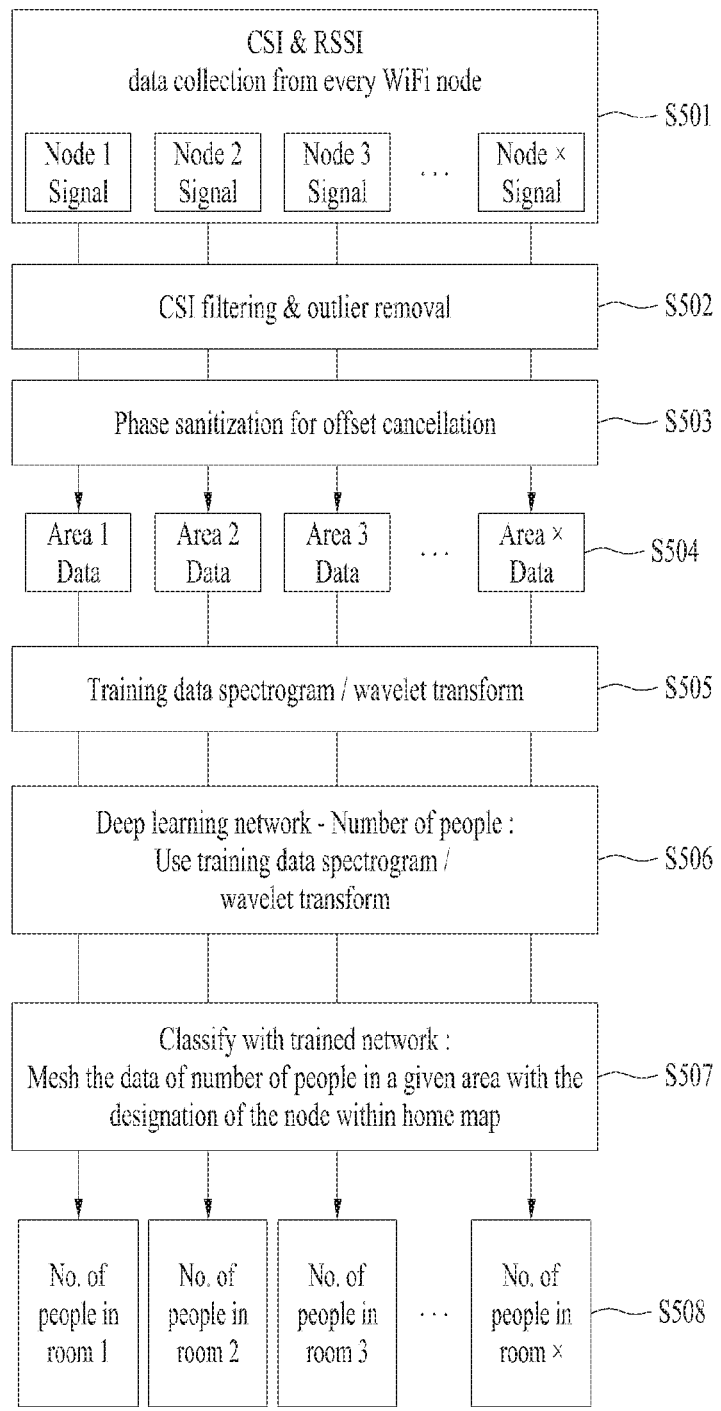
FIG. 5 is a diagram to describe an example of counting the number of people using a deep learning neural network according to one embodiment of the present invention.

FIG. 5 is a diagram to describe an example of counting the number of people using a deep learning neural network according to one embodiment of the present invention.

Steps S501 to S504 are identical to the former steps S301 to S304 shown in FIG. 3.

Namely, in the step S501, a DNN based security system (hereinafter, system) may collect CSI and RSSI data from all WiFi/RF nodes. Thereafter, the collected CSI and RSSI data may be processed. For details, steps S302 and S303 are described as follows.

In the step S502, the system can perform filtering of the CSI data and eliminate outliers of the CSI data in a CSI and RSSI data pre-processing step.

In the step S503, in the CSI and RSSI data processing step, the system can eliminate errors caused by a phase of a signal generated due to frequency offsets etc.

In the step S504, the system can collect occupant data per designated area. For example, the system can collect data from an empty room, data from a room with a person in multiple states (e.g., moving, standing still, sitting, lying down, etc.), or data from a room with multiple people.

In a step S505, the system can detect the number of people using a training data spectrogram and wavelet transform.

In a step S506, the system can detect the number of people through a deep learning network. Particularly, the system can detect the number of people using the step S505.

In a step S507, the system can classify with a network trained through the steps S501 to S506. Particularly, the system can mesh the data of the number of people in a given area with the designation of a node in an indoor environment.

In a step S508, the system can check the number of people in the given area.

The present invention is described in detail as follows.

The number of people can be detected passively by a WiFi radio node. Here, using a deep learning neural network, a blind source decomposition of CSI data can be performed. And, by estimating the number of the independent sources, the number of people can be counted. The pre-processing step of detecting the number of people may employ an embodiment of detecting presence of a network.

Namely, in a step of pre-processing CSI and RSSI data at a WiFi/RF node, the system may eliminate outliers from the CSI and RSI data but may not eliminate errors introduced in a phase of a signal due to frequency offsets etc.

According to one embodiment of the present invention, the system can generate a time-frequency representation or a joint time-scale representation of the pre-processed CSI log.

The system can generate training data, and the time-frequency or time-scale representation of the data can be generated in an indoor environment. Here, the number of people inside the room is varied and the CSI logs can be generated. The CSI logs are updated to capture an ambient RF environment without human presence.

Architectures of the deep learning network and the deep learning neural network training are described as follows.

According to one embodiment of the present invention, a convolutional neural network or deep learning discriminant analysis can be employed. Time-frequency or time-scale data can be used to train the neural networks. Batches of data are employed to train the network using stochastic gradient descent.

Particularly, the features of the present invention are described as follows.

One embodiment of the present invention employs a deep learning network to detect the number of people, whereas the number of people is detected based on the first and second order statistics of CSI data in the related art. By such a method, the reliable number of people can be detected.

In the following, an embodiment (not shown in the drawing) of detecting a device-free location in an indoor environment using a deep learning neural network according to one embodiment of the present invention is described.

CSI and RSSI data collected at RF/WiFi nodes can be changed with the presence of people at different locations in an indoor environment. However, the changes in the RF signature amplitude due to a human presence are significantly lesser than introduced by a metallic object. The indoor environment can be sub-divided into several small regions and the CSI logs can be obtained on each sub-region. Here, the CSI logs can be obtained from a person present in each of these cells. A size of each of these cells can be varied between a first region (e.g., 2 m×2 m) and a second region (e.g., 1 m×1 m). The CSI logs from the ambient empty environment can serve as the baseline for training the neural network.

The architecture of the deep learning network is described as follows. According to one embodiment of the present invention, linear discriminant analysis can be employed on a deep learning neural network. In this case, the CSI data pre-processing is the same as what we had described for presence detection inside a room.

Particularly, the present invention is characterized in identifying a device at an indoor location using WiFi/RF signal changes and a deep leaning network.

A corresponding embodiment is described as follows.

According to one embodiment of the present invention, a system can detect a lip movement using WiFi and employ a deep learning network to detect presence of cry from the lip movement. Here, for the lip movement detection, the system can analyze the detected lip movement of an infant and then determine presence of an infant cry by comparing lips associated with an existing infant cry. Particularly, the system can extract the CSI changes due to lip movement associated with a crying baby using an existing WiFi based embodiment to detect a lip movement, generate labeled training data while crying as well as a random lip movement, train the supervised deep learning convolutional neural network, and detect the infant cry.

Hence, the WiFi based cry detection system enables safety in both indoor and vehicular environments.

According to one embodiment of the present invention, a typical sound made during infant crying may correspond to a sequence of "/a/" as well other high and low pitched sounds. And, secondary parameters including the respiration rate may be used to detect an infant cry.

Moreover, a multitude of WiFi nodes may be positioned close to a baby crib or a car seat to detect lip movement.

Likewise, a WiFi device can be disposed near a baby crib and used to detect an infant signal.

In detail, template WiFi CSI data may be associated with the lip movement when an infant cry is created. Here, labeled database may be used to train a machine learning solution for cry detection. Particularly, a range Doppler map from overlapped segments of CSI data with lip movement can be used to train a deep learning neural network. And, the system employs a supervised or unsupervised deep learning network so as to identify infant cry from CSI changes with lip movement.

Particularly, the present invention can detect the lip movements using changes in CSI data, identify the lip changes associated with a baby cry, and identify the CSI changes for lip movements associated with a crying baby.

Moreover, a method of deciphering a class of a word spoken using WiFi can use a related art technology. Likewise, a method of analyzing a signal of an infant cry using audio signal processing techniques can use a related art technology.

Particularly, the features of the present invention are described as follows.

According to one embodiment of the present invention, it is able to detect presence of toddlers near stair ways and other unsafe regions in home. Here, the DNN is employed to detect human presence, identify if the human being is an infant, identify the location of the infant, and make a report to a system if the infant location is found unsafe. Particularly, a deep learning neural network can be used to reliably identify a toddler. WiFi devices are positioned near unsafe zones to detect presence. The system according to one embodiment of the present invention can employ WiFi/RF CSI logs along with a deep learning network to identify the location of the toddler. A WiFi device positioned inside a car can detect movements, a breathing rate etc. of a toddler and report the presence of the toddler.

According to one embodiment of the present invention, it is able to detect and identify elderly people in a home environment. Namely, according to one embodiment of the present invention, a system can identify positions and postures of elderly people using a deep learning neural network and WiFi CSI changes.

In this case, the network can give feedback to the elderly and guide them to move to different locations. As example of the feedback, the system can appropriately turn on lighting in a proceeding direction of the elderly. The system enables the elderly to identify handles to grip on near stair ways, bathrooms and other unsafe places. And, the system can identify postures (e.g., standing, sitting, falling, etc.) using the changes in WiFi CSI and a deep learning neural network.

Particularly, features of the present invention are described as follows.

A system based on a deep learning neural network according to one embodiment of the present invention can identify a toddler in an indoor/vehicular environment in an unsafe region. And, the system enables safe movement of the elderly in an indoor environment using changes in CSI signature. Moreover, the system can identify the posture and notify location.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal. Therefore, this description is intended to be illustrative, and not to limit the scope of the claims. Thus, it is intended that the present invention covers the modifications and variations of this invention provided they come within the scope of the appended claims and their equivalents.

INDUSTRIAL APPLICABILITY

The present invention has industrial applicability in a deep learning neural network based security system and is applicable repetitively.

What is claimed is:

1. A deep learning neural network based security system, comprising:
   at least one WiFi node; and
   a deep learning module configured to:
      detect an object from a WiFi signal received from the at least one WiFi node;
      identify information of the detected object; and
      classify a network with reference to presence of the object, a type of the object, and a number of the object.

2. The deep learning neural network based security system of claim 1, wherein:
   the information of the object includes at least one of location and direction of the object, activity of the object, a type of the object, a number of the object and a posture of the object; and
   the type of the object comprises a human or pet.

3. The deep learning neural network based security system of claim 1, further comprising a gateway, wherein the deep learning module receives a packet of the at least one WiFi node from the gateway, the at least one WiFi node being located in an indoor environment.

4. The deep learning neural network based security system of claim 1, wherein the deep learning module uses at least one of a deep learning neural network, a convolutional neural network, a deep discriminant network, or an auto encoder.

5. The deep learning neural network based security system of claim 4, wherein the deep learning neural network detects data from the WiFi signal by real time.

6. The deep learning neural network based security system of claim 4, wherein:
   the deep learning module uses the convolutional neural network; and
   the convolutional neural network detects presence of the object from the WiFi signal.

7. The deep learning neural network based security system of claim 4, wherein:
   the deep learning module uses the deep discriminant network; and
   the deep discriminant network detects a location of the object from the WiFi signal.

8. The deep learning neural network based security system of claim 4, wherein:
   the deep learning module uses the auto encoder; and
   the auto encoder detects and classifies activity of the object from the WiFi signal.

9. A deep learning neural network based security system, comprising:
   at least one WiFi node; and
   a deep learning module configured to:

detect an object from a WiFi signal received from the at least one WiFi node;

identify information of the detected object; and collect Channel State Information (CSI) and Received Signal Strength Indicator (RSSI) data from the at least one WiFi node and process the collected CSI and RSSI data.

10. The deep learning neural network based security system of claim 9, wherein the deep learning module filters the CSI data, removes outlier, and eliminates an error due to a phase of a signal generated by a frequency offset, using the processed CSI and RSSI data.

11. The deep learning neural network based security system of claim 9, wherein the deep learning module generates Short-Time Fourier Transform (STFT) and Continuous Wavelet Transform (CWT) of the CSI data.

12. The deep learning neural network based security system of claim 1, wherein the deep learning module detects whether the object is present in a preset area.

13. The deep learning neural network based security system of claim 1, wherein the deep learning module is configured to:

identify whether the object is a person or a pet according to a type of the object;

determine that the object is the person;

determine whether the person is known or unknown to the deep learning neural network based security system; and determine an age of the person.

14. The deep learning neural network based security system of claim 12, wherein the deep learning module detects a number of the object present in the preset area.

15. A method of controlling a deep learning neural network based security system, the method comprising:

detecting an object from a WiFi signal received from at least one WiFi node;

identifying information of the detected object; and classifying a network with reference to presence of the object, a type of the object, and a number of the object.

16. The method of claim 15, further comprising collecting Channel State Information (CSI) and Received Signal Strength Indicator (RSSI) data from the at least one WiFi node and processing the collected CSI and RSSI data.

17. The method of claim 16, further comprising generating Short-Time Fourier Transform (STFT) and Continuous Wavelet Transform (CWT) of the CSI data.

18. The deep learning neural network based security system of claim 2, wherein the information of the object includes the activity of the object, the type of the object, the number of the object and the posture of the object.

* * * * *